United States Patent
Kirschner

(10) Patent No.: US 9,010,697 B1
(45) Date of Patent: Apr. 21, 2015

(54) SINGLE ANCHOR UTILITY HANGER

(71) Applicant: Kraig A. Kirschner, Corona, CA (US)

(72) Inventor: Kraig A. Kirschner, Corona, CA (US)

(*) Notice: Subject to any disclaimer, the term of this patent is extended or adjusted under 35 U.S.C. 154(b) by 0 days.

(21) Appl. No.: 13/937,440

(22) Filed: Jul. 9, 2013

Related U.S. Application Data

(63) Continuation-in-part of application No. 13/759,841, filed on Feb. 5, 2013, now abandoned.

(51) Int. Cl.
*F16L 3/10* (2006.01)
*F16L 3/12* (2006.01)

(52) U.S. Cl.
CPC ........................... *F16L 3/12* (2013.01)

(58) Field of Classification Search
USPC ........ 248/56, 65, 71, 73, 68.1, 62, 63, 58, 60, 248/61, 74.1, 74.2, 74.3, 74.4; 174/74 R, 80, 174/74 A
See application file for complete search history.

(56) References Cited

U.S. PATENT DOCUMENTS

| | | | |
|---|---|---|---|
| 2,396,837 A | 3/1946 | Ellinwood | |
| 5,220,710 A * | 6/1993 | Laudan et al. | 24/279 |
| 5,261,633 A | 11/1993 | Mastro | |
| 5,384,936 A * | 1/1995 | Van Walraven | 24/279 |
| 6,732,982 B1 | 5/2004 | Messinger | |
| 7,150,438 B2 * | 12/2006 | Schaty | 248/74.1 |
| 7,316,138 B2 | 1/2008 | Goshima et al. | |
| 7,716,959 B2 | 5/2010 | Okada | |
| 7,770,848 B2 * | 8/2010 | Johnson et al. | 248/65 |
| 8,033,579 B2 | 10/2011 | Takeda et al. | |
| 2007/0295867 A1 | 12/2007 | Hennon | |
| 2011/0204192 A1 | 8/2011 | Geppert et al. | |
| 2012/0112016 A1 | 5/2012 | Blanchard et al. | |
| 2013/0313375 A1 * | 11/2013 | Dworak, Jr. | 248/74.2 |

OTHER PUBLICATIONS

Cooper B-Line Flyer—Tolco Fig. 22L2—One Hole Hanger/Restrainer for CPVC & Steel Pipe—2012.

* cited by examiner

*Primary Examiner* — Steven Marsh
(74) *Attorney, Agent, or Firm* — Novak Druce Connolly Bove + Quigg LLP

(57) ABSTRACT

A hanger for utility pipe includes a base having a channel with a pivot at one end and a mounting hole at the other. An arcuate strap is pivotally mounted to the base at the pivot and includes a fastening hole extendible into the channel in alignment with the mounting hole. The strap includes a circular cylindrical segment between two straight parallel segments to receive a pipe between the strap and the base. A fastener is employed through the fastening hole and the mounting hole to attach the hanger to a supporting structure.

12 Claims, 2 Drawing Sheets

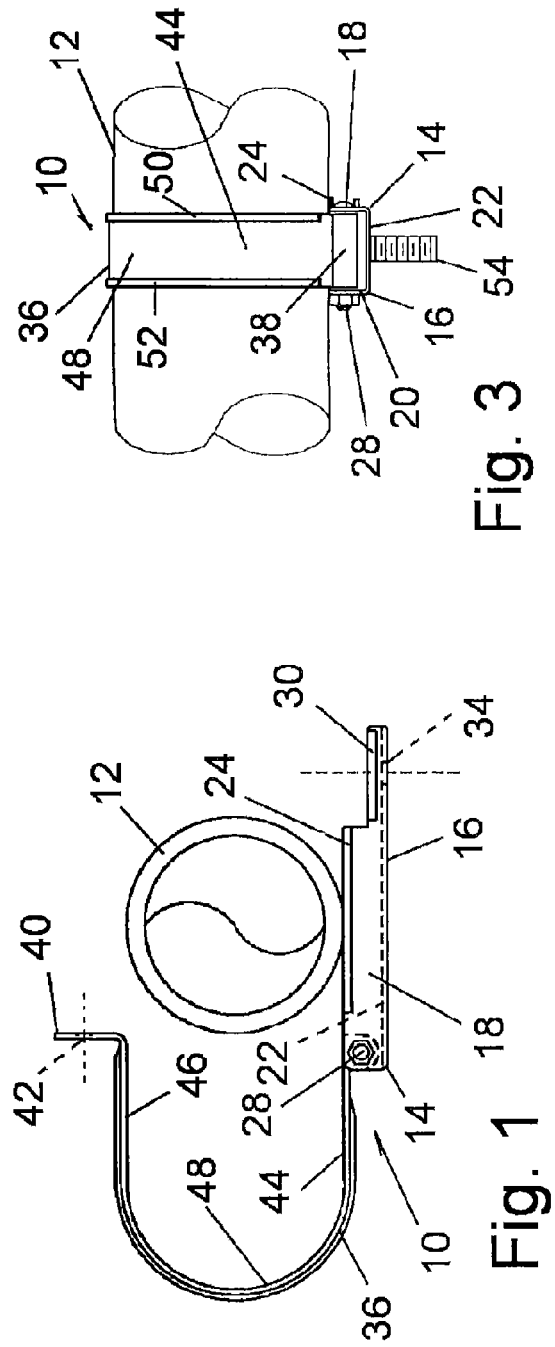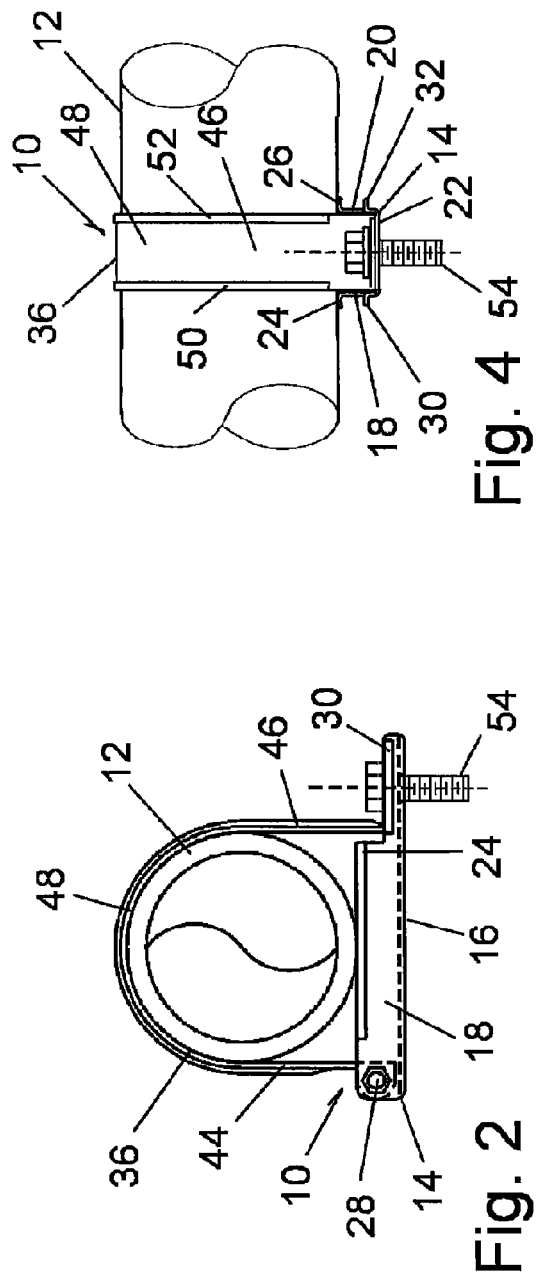

SINGLE ANCHOR UTILITY HANGER

PRIORITY APPLICATION

This application is a continuation-in-part of U.S. patent application Ser. No. 13/759,841, filed Feb. 5, 2013.

BACKGROUND OF THE INVENTION

The field of the present invention is hardware for hanging utility pipe.

A wide variety of pipe hangers have been employed for the support and retention of utility pipe and conduits in building applications. In designing such hangers, it is important to recognize a large number of structural, ergonomic and utilitarian considerations, both for the hanger itself and for the pipe or conduit application. Among many, the size tolerance of the grip has gained importance because of the widespread use of CPVC pipe which cannot stand the same level of lateral force as steel pipe. The preferred displacement of the hung pipe from a building surface can vary with application to accommodate pipe fittings and room for partial disassembly. Such set offs preferably are not to impact the attachment means and structural stability. Further, ease of assembly is important for consistent structural integrity. These and other desirable features often conflict with the need for acceptable costs and secure support.

SUMMARY OF THE INVENTION

The present invention is directed to a hanger for utility pipe which includes a base and an arcuate strap to be mounted in a single operation. The base includes a channel open toward the arcuate strap having a pivot adjacent one end and a mounting hole adjacent the other. The arcuate strap is pivotally mounted to the pivot at one end and includes a fastening hole at the other which can be aligned with the mounting hole of the base. With the channel open toward the arcuate strap, the arcuate strap at the fastening hole may be secured in the channel. This forms a flat plate engagement for direct attachment to the supporting structure regardless of the offset provided by the base for displacing the pipe from the support surface. Further, the engagement provides a juxtaposed plate contact which spreads the engagement load and presents a fixed grip that cannot be drawn too tight.

Accordingly, it is an object of the present invention to provide an improved single anchor utility hanger. Other and further objects and advantages will appear hereinafter.

BRIEF DESCRIPTION OF THE DRAWING

FIG. 1 is a side view of an open utility hanger with a pipe in position for engagement.

FIG. 2 is a side view of the hanger closed about a pipe.

FIG. 3 is an end view of the hanger from the pivot end.

FIG. 4 is an end view of an engaged hanger from the engagement end.

DETAILED DESCRIPTION OF THE PREFERRED EMBODIMENT

Figure 5:
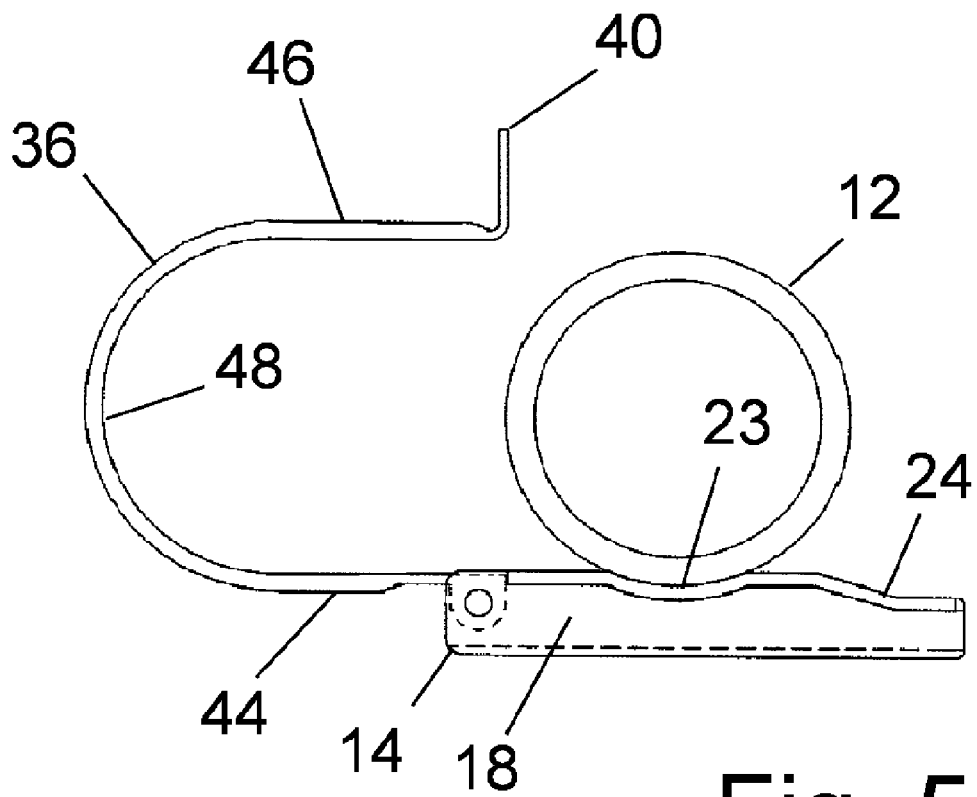
FIG. 5 is a side view of a second embodiment of an open utility hanger with a pipe in position for engagement.

Turning in detail to the Figures, a utility hanger, generally designated 10, is illustrated with a utility pipe 12. The hanger 10 includes a base 14. The base 14 is generally defined by a channel 16 having sidewalls 18 and 20 with a bottom 22. The height of the sidewalls 18, 20 may be chosen to give the amount of set-off desired for the pipe 12 from the supporting surface.

Figure 6:
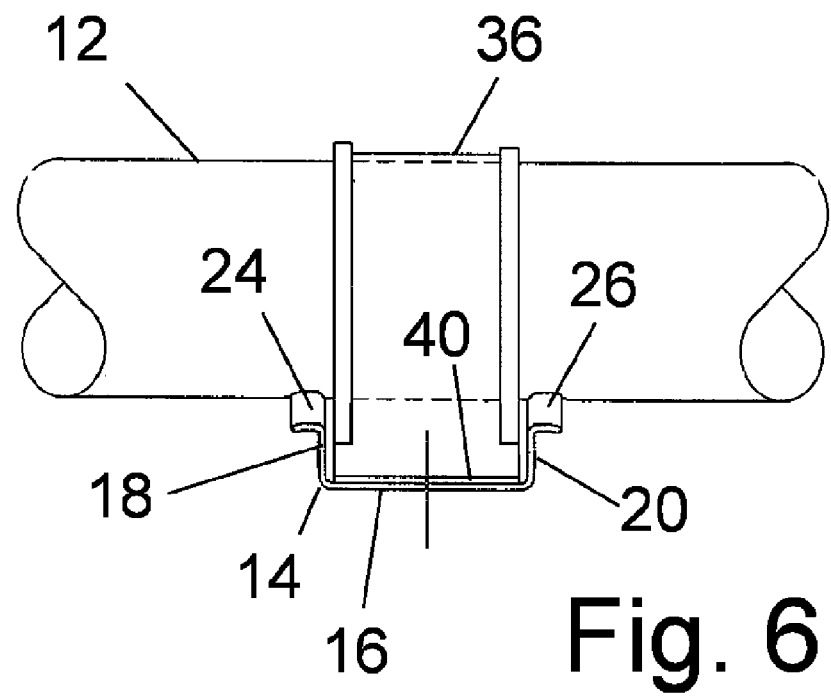
FIG. 6 is an end view of the hanger of FIG. 5 from the engagement end.

The upper edges of the sidewalls 18, 20 are shown to lie in a flat plane. These edges may instead form a concavity 23 to accommodate the pipe profile, see FIG. 5. Laterally extending flanges 24, 26 can be employed to spread the load of a pipe 12 and increase the rigidity of the sidewalls 18, 20. The sidewalls 18, 20 are of a reduced height at the fastener end of the channel 16. This may be accomplished as in the first embodiment seen in FIGS. 1 and 2 where there is a discontinuity in sidewall height. Alternatively, the sidewalls 18, 20 can decrease with no surface discontinuity as seen in FIG. 5. Both embodiments provide low sidewalls 18, 20 at the fastener location for convenient access. The first embodiment has separate flanges 30, 32 which extend laterally from the area of reduced channel height while the second embodiment has the flanges 24, 26 extending continuously along the sidewalls 18, 20 to the reduced height portion. The second embodiment of FIGS. 5 and 6 can spread load pressure, avoid stress raisers and provide continuous laterally extending flanges 24, 26.

A pivot 28 extends between the two sidewalls 18, 20 adjacent the end of the channel 16 opposite the fastener end. A mounting hole 34 extends through the base 14 adjacent the fastener end of the channel 16.

An arcuate strap 36 is pivotally mounted to the pivot 28 by a rolled journal bearing 38 at one end of the strap 36. The other end of the strap 36 includes a mounting flange 40 having a fastening hole 42 therethrough. Between the ends of the arcuate strap 36, the strap includes two straight segments 44, 46 with a semicircular cylindrical segment 48 therebetween. The straight segments 44, 46 are mutually parallel such that the distance between the straight segments 44, 46 is equal to the inside surface diameter of the circular cylindrical segment 48. The lengths of the straight segments 44, 46 are such that the sidewalls 18, 20 of the base 14 are the same distance from the center of the semicircular segment 48 as the distance between the straight segments 44, 46 when the strap 36 is pivoted to meet the base 14. The strap 36 also has formed flanges 50, 52 to add strength and rigidity. The concavity 23 of the base 14 in the second embodiment may have the same surface diameter as the semicircular cylindrical segment 48 with the diameters being coincident when the arcuate strap 36 is pivoted to meet the base 14 to effectively capture the utility pipe 12.

A fastener 54 is employed to secure the strap 36 about the pipe 12. The fastener 54 may conveniently be selected depending upon the supporting structure to which the hanger is attached, such as a bolt 54 as shown in this embodiment, a wood screw, a molly bolt or the like. A threaded fastener 54 with a head to engage the strap 36 about the fastening hole 42 is convenient and easily installed. The fastener 54, preferably selected based on the supporting structure requirements, may be uniform as to the hanger requirements. The anchoring of the hanger 10 with the juxtaposed plate contact of the mounting flange 40, the bottom 22 of the channel and the supporting surface is independent of the height of the sidewalls 18, 20 of the channel 16.

With the fastening hole 42 through the mounting flange 40 and the mounting hole 34 through the bottom 22 of the channel 16 brought together, plate engagement both between the base 14 and the strap 36 and between these and the supporting structure form a stable assembly and mounting. The assembly is independent of the height of the base and may employ a fastener 54 uniform as to the hanger requirements but selected based on the supporting structure requirements. The aspects of plate engagement further extend across the full length of the base 14. The employment of the fastener 54 is also facilitated by the reduced height of the sidewalls 18, 20 immediately adjacent the mounting hole 34.

Thus, an improved single anchor utility hanger is disclosed. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A hanger for utility pipe, comprising
   a base including a bottom, two sidewalls, an open channel in the base defined by the bottom and the two sidewalls, a pivot adjacent a first end of the channel and extending in the channel between the two sidewalls, and a mounting hole in the channel through the bottom adjacent a second end of the channel;
   an arcuate strap pivotally mounted to the pivot adjacent a first end of the arcuate strap and including a fastening hole adjacent a second end of the arcuate strap, the arcuate strap extendable into the channel to an alignment of the fastening hole with the mounting hole, the open channel facing the strap.

2. The hanger of claim 1, the two sidewalls having lower sections immediately adjacent the mounting hole.

3. The hanger of claim 2, the two sidewalls each having a flange extending perpendicularly to and continuously along a length of the sidewall including across the lower sections.

4. The hanger of claim 3, the two sidewalls each having a concavity facing the arcuate strap with alignment of the fastening hole with the mounting hole.

5. The hanger of claim 3, the arcuate strap further including a circular cylindrical segment and a straight segment extending from either end of the circular cylindrical segment, the straight segments extending in parallel from the ends of the circular cylindrical segment into the channel in the base with the circular cylindrical segment displaced from the channel and with alignment of the fastening hole with the mounting hole in the channel in the base, the two sidewalls each having a concavity facing the arcuate strap with alignment of the fastening hole with the mounting hole through the bottom.

6. The hanger of claim 1 further comprising
   a threaded fastener extendable through the fastening hole and the mounting hole when the holes are aligned, the base having an exterior planar surface extending from the first end to the second end through which the threaded fastener extends.

7. The hanger of claim 1, the arcuate strap having two mutually parallel straight segments and a circular cylindrical segment therebetween, the straight segments extending in parallel from the ends of the circular cylindrical segment into the channel in the base with the circular cylindrical segment displaced from the channel and with alignment of the fastening hole with the mounting hole in the channel, a distance between the mutually parallel straight segments being equal to a distance from the center of the circular segment to the two sidewalls.

8. A hanger for utility pipe, comprising
   a base including a bottom, two sidewalls, an open channel in the base defined by the bottom and the two sidewalls, a pivot adjacent a first end of the channel and extending in the channel between the two sidewalls, and a mounting hole in the channel through the bottom adjacent a second end of the channel;
   an arcuate strap pivotally mounted to the pivot adjacent a first end of the arcuate strap and including a fastening hole adjacent a second end of the arcuate strap, the arcuate strap extendable into the channel to an alignment of the fastening hole with the mounting hole;
   a threaded fastener extendable through the fastening hole and the mounting hole when the holes are aligned, the arcuate strap further including two mutually parallel straight segments and a circular cylindrical segment therebetween, the straight segments extending in parallel from the ends of the circular cylindrical segment into the channel in the base with the circular cylindrical segment displaced from the channel and with alignment of the fastening hole with the mounting hole in the bottom, a distance between the mutually parallel straight segments being equal to a distance from the center of the circular segment to the two sidewalls with alignment of the fastening hole with the mounting hole, the open channel facing the strap, the base having an exterior planar surface extending from the first end to the second end through which the threaded fastener extends.

9. A hanger for utility pipe, comprising
   a base including a bottom, two sidewalls, an open channel in the base defined by the bottom and the two sidewalls, a pivot adjacent a first end of the channel and extending in the channel between the two sidewalls, and a mounting hole through the bottom adjacent a second end of the channel;
   an arcuate strap pivotally mounted to the pivot adjacent a first end of the arcuate strap and including a fastening hole adjacent a second end of the arcuate strap, the arcuate strap extendable into the channel to an alignment of the fastening hole with the mounting hole, the two sidewalls each having a concavity facing the arcuate strap with alignment of the fastening hole with the mounting hole, the arcuate strap further including two mutually parallel straight segments and a circular cylindrical segment therebetween, the straight segments extending in parallel from the ends of the circular cylindrical segment into the channel in the base with the circular cylindrical segment displaced from the channel and with alignment of the fastening hole with the mounting hole in the bottom, the open channel facing the strap.

10. The hanger of claim 9, the two sidewalls each having a lower section immediately adjacent the mounting hole and a flange extending perpendicularly and continuously along a length of the sidewall across the reduced height.

11. The hanger of claim 9, the concavity on the sidewalls defining a surface diameter coincident with the surface diameter of the semicircular cylindrical segment.

12. The hanger of claim 9 further comprising
    a threaded fastener extendable through and beyond the fastening hole and the mounting hole when the holes are aligned, the base having an exterior planar surface through which the threaded fastener extends.

* * * * *